US008778494B2

(12) United States Patent
Edler et al.

(10) Patent No.: US 8,778,494 B2
(45) Date of Patent: Jul. 15, 2014

(54) PIGMENT FOR LASER MARKING

(75) Inventors: Gerhard Edler, Trebur (DE); Helge Bettina Kniess, Rossdorf (DE); Klaus Bernhardt, Gross-Umstadt (DE)

(73) Assignee: Merck Patent GmbH, Darmstadt (DE)

( * ) Notice: Subject to any disclaimer, the term of this patent is extended or adjusted under 35 U.S.C. 154(b) by 122 days.

(21) Appl. No.: 13/257,013

(22) PCT Filed: Feb. 27, 2010

(86) PCT No.: PCT/EP2010/001232
§ 371 (c)(1),
(2), (4) Date: Sep. 16, 2011

(87) PCT Pub. No.: WO2010/105735
PCT Pub. Date: Sep. 23, 2010

(65) Prior Publication Data
US 2012/0010345 A1  Jan. 12, 2012

(30) Foreign Application Priority Data

Mar. 18, 2009 (DE) .......................... 10 2009 013 430
Nov. 30, 2009 (DE) .......................... 10 2009 056 093

(51) Int. Cl.
B32B 5/16 (2006.01)
(52) U.S. Cl.
USPC ........................... 428/402; 428/403; 428/407
(58) Field of Classification Search
USPC ........................................ 428/402, 403, 407
See application file for complete search history.

(56) References Cited

U.S. PATENT DOCUMENTS

| 3,839,064 A | * | 10/1974 | Vincent .......................... 523/201 |
| 5,562,978 A | * | 10/1996 | Jacobson ....................... 428/323 |
| 7,217,745 B2 | * | 5/2007 | Edler .............................. 523/171 |
| 7,674,845 B2 | | 3/2010 | Van Duijnhoven et al. |
| 7,678,451 B2 | | 3/2010 | Gelissen et al. |
| 7,922,859 B2 | | 4/2011 | Rosenburger |
| 2006/0074165 A1 | | 4/2006 | Gelissen et al. |
| 2006/0148968 A1 | | 7/2006 | Van Duijnhoven et al. |
| 2008/0004363 A1 | | 1/2008 | Rosenburger |

FOREIGN PATENT DOCUMENTS

| DE | 10 2004 045 305 A | 9/2004 |
| DE | 10 2004 045 305 A1 | 9/2004 |
| DE | 603 04 897 T2 | 12/2006 |
| EP | 1 802 420 B1 | 7/2007 |
| EP | 2 050 720 A1 | 4/2009 |
| EP | 1611209 B1 | 12/2009 |
| WO | 2004092284 A1 | 10/2004 |
| WO | 2006/029677 A1 | 3/2006 |

OTHER PUBLICATIONS

International Search Report, dated May 27, 2010, issued in corresponding PCT/EP2010/001232.
English Translation Abstract for EP1611209B1 dated Dec. 23, 2009.
Chinese Search Report from corresponding Chinese Application No. 201080011931.1 dated Mar. 5, 2013.

* cited by examiner

*Primary Examiner* — Leszek Kiliman
(74) *Attorney, Agent, or Firm* — Millen, White, Zelano & Branigan, P.C.

(57) ABSTRACT

The present invention relates to an intrinsically markable laser pigment in the form of a reducible metal compound in the form of a preparation, and to the use thereof in inorganic systems and in organic polymers, in particular plastics, surface coatings, automobile paints, powder coatings, printing inks, paper coatings and papermaking stocks.

26 Claims, No Drawings

PIGMENT FOR LASER MARKING

The present invention relates to an intrinsically markable laser pigment in the form of a preparation of a reducible metal compound, to a process for the preparation thereof, and to the use thereof in inorganic systems, such as, for example, water-glass or coatings based on water-glass, and organic polymers, in particular plastics, surface coatings, automobile paints, powder coatings, printing inks, paper coatings and papermaking stocks.

The labelling of commercial products by means of laser radiation has now become standard technology in virtually all branches of industry. Thus, for example, production data, batch numbers, use-by dates, bar codes, company logos, serial numbers, etc., frequently have to be applied to plastics or plastic films.

The contrast necessary for labelling is preferably generated by the following processes:
1. Removal of layers of different colour
    It is disadvantageous that this is a very complex process which can only be used to a limited extent.
2. Carbonisation of an organic matrix
    This is currently the most frequently employed process. The carbonisation is effected here either by absorption of the laser radiation in the organic matrix itself or by absorption by added absorbers. In both cases, the carbonisation of the polymer material is effected by a brief heat shock which burns the surrounding matrix. The capacity of the matrix to form carbon to an adequate extent on burning is of crucial importance for the marking result here. Thus, the polymer employed or the matrix formulation has a considerable effect on the marking result. This dependence generally results in extensive preliminary experiments in order to determine a marking result which is adequate for the particular application. In the case of changes in the composition and in many cases also even in the case of variations in the raw-material quality, the suitable inscription parameters always have to be re-determined.
3. Colour change of added pigments
    In order to avoid the above-mentioned dependence, it has already been attempted for some time to develop pigments or additives which themselves carry out a colour change (mark intrinsically) on laser bombardment. Such additives generate a mark virtually independently of the surrounding matrix. They can therefore be employed in all plastics. Even in thin layers, such as coatings, paints and prints, marks are possible without significantly damaging the layers. However, products having this property have hitherto either been built up on the basis of heavy-metal compounds or have merely been described in the literature without entering into industrial practice.

The object of the present invention is therefore to find an intrinsically marking additive for laser marking that gives very good marking results, in particular high-contrast and sharp marks, under the action of laser light and at the same time is free from heavy metals and can be prepared on an industrial scale.

The object of the present invention is likewise to provide a process for the preparation of an intrinsically marking laser additive.

A further object of the invention consists in indicating the use of a laser additive of this type.

Surprisingly, it has been found that finely divided metal compounds which are reduced to coloured metal compounds in a low oxidation state or to the metal by the laser radiation are highly suitable as intrinsically marking additives for laser marking. Oxides of metals which are as neutral in colour as possible are particularly suitable, where the latter should be non-toxic for universal usability and should also not form any toxic reaction products on reduction.

The present invention relates to an intrinsically laser-markable pigment which is distinguished by the fact that the pigment having a particle size of 0.01-200 µm is in the form of a preparation which comprises one or more reducible metal compounds and a reducing agent.

The present invention likewise relates to a process for the preparation of the intrinsically laser-markable pigment according to the invention, in which one or more reducible metal compounds are partially or fully coated with a reducing agent or a reducing agent is partially or fully coated with one or more reducible metal compounds.

The present invention also relates to the use of the laser pigment according to the invention in organic polymers, in particular in plastics, plastic films, surface coatings, automobile paints, powder coatings, printing inks, paper coatings and papermaking stocks, and in inorganic systems, such as, for example, water-glass or coatings based on water-glass.

The invention furthermore also relates to the inorganic systems and organic polymer systems which comprise the laser pigment according to the invention.

Under the action of laser light, the polymer doped with the laser pigment according to the invention shows a dark mark with high contrast and pronounced edge sharpness on a pale or coloured background.

Metal oxides or metal-oxide mixtures as reducible metal compound have shown themselves to be advantageous with respect to the by-products formed on reduction.

The metal oxides here can be in doped or undoped form.

A heavy metal-free metal oxide which can be reduced very well to coloured metal suboxides or to the metal is, for example, titanium dioxide, which can likewise be in doped or undoped form.

It is known that titanium dioxide can be reduced to a stable, bluish-black suboxide of the formula $TiO_x$, where x is less than 2 and greater than 1, under the action of hydrogen at elevated temperature.

However, when a laser pigment or laser additive is used as intended within the polymer matrix, for example a plastic, a mobile reaction partner, as in the case of the hydrogen reduction mentioned above, is generally not available to it. Instead, the reaction is between solids. The reaction partners must therefore be in close contact with one another in order to be able to form a sufficient amount of reaction product, which is necessary for high-contrast marking, in the short action time of the laser bombardment. This is achieved in accordance with the invention by sheathing the reducible metal compound, preferably the metal oxide or metal-oxide mixture, with a reducing agent or coating a reducing agent with a reducible metal compound, preferably a metal oxide or metal-oxide mixture. Suitable reducing agents here are either all substances which are readily oxidised and can be precipitated on the surface of a metal compound, preferably a metal oxide or metal-oxide mixture, or which can be sheathed, as particles, with a reducible metal compound, preferably a metal oxide or metal-oxide mixture.

The laser pigment according to the invention essentially consists of two constituents:
1. at least one metal compound, preferably a metal oxide or metal-oxide mixture, which can easily be reduced, and
2. at least one reducing agent.

It is important here that the metal compound is in direct or intimate contact with the reducing agent, for example by coating the metal compound with the reducing agent or by coating of the reducing agent with the metal compound.

The material to be coated in each case is in particulate form.

If the reducible metal compound is coated with a reducing agent, it is in the form of support-free particles or in the form of a coating on a support. It goes without saying here that not only in each case an individual particle, but also a group comprising a plurality of particles can be coated simultaneously with the reducing agent, so that the laser pigment according to the invention can be composed either of a single coated particle or of a group of particles which, with the common coating, form a pigment. The same applies if the reducible metal compound is present on a support (for example on a mica flake, as described below).

If the reducing agent is coated with a reducible metal compound, the reducing agent is in the form of particles, i.e. in particulate form.

If the reducible metal compound is a metal oxide, preference is given to the use of titanium dioxide, furthermore also $B_2O_3$, $Fe_2O_3$ or $SnO_2$. Further suitable reducible metal compounds are, in particular, bismuth oxychloride, bismuth oxide, silver halides, such as, for example, AgCl, but also zinc sulfide or tin oxalate.

The doped metal oxide employed is preferably titanium dioxide doped with Al, Si, Zr, Mn or Sb.

Preferred metal-oxide mixtures are SnO/SbO, $(Sn,Sb)O_2$ or bismuth vanadate.

If the reducible metal compound in the form of support-free particles is coated with a reducing agent, the particle shape of the metal compound only plays a secondary role for the marking result. The metal compound can in principle be present in all known particle shapes, for example as flakes, beads, fibres, cubes, rods, cuboids or also as approximately isotropic granules of irregular shape. Preference is given to isotropic shapes, such as beads and cubes, or irregularly shaped granules.

Support-free particles of this type have, in accordance with the invention, a particle size (corresponds to the length of the longest axis) in the range from 1 nm to 1000 nm.

With increasing particle size, the hiding power of the (core) particles increases since they scatter incident light to an increased extent with increasing size. Depending on the intended use of the laser additive according to the invention, i.e., in particular, depending on the type of materials to be marked by laser and the layer thickness of the layers comprising laser additives, different ranges of particle sizes from the above-mentioned particle-size range are therefore preferred in each case.

If only slight light scattering and consequently a low hiding power of the reducible metal compound is desired, particle sizes in the range from 10 nm to <100 nm are particularly preferred.

If, by contrast, a higher hiding power is allowed or desired, particle sizes in the range from 100 nm to 700 nm are particularly preferred.

Furthermore, the metal compound to be reduced may also be applied to a support or a mixture of different supports. Suitable support materials are all support materials known to the person skilled in the art, in particular transparent or semi-transparent, preferably flake-form, substrates. Preferred supports are phyllosilicates. Particularly suitable are natural and/or synthetic mica, talc, kaolin, flake-form iron oxides or aluminium oxides, glass flakes, $SiO_2$ flakes, $TiO_2$ flakes, flake-form mixed oxides, such as, for example, $FeTiO_3$, $Fe_2TiO_5$, graphite flakes or other comparable materials. Preference is given to the use of mica flakes, glass flakes or graphite flakes. It is also possible to use mixtures of different support materials which are coated with one and the same metal compounds or alternatively with different metal compounds.

The support materials are preferably flake-form substrates, which generally have a thickness of 0.005-10 μm, in particular 0.05-5 μm. The size in the other two dimensions is usually 0.01-100 μm, preferably 0.1-50 μm and in particular 0.1-20 μm.

If the support material is covered with a layer of a reducible metal compound, in particular a metal-oxide layer, the thickness of the layer is preferably 1-500 nm, in particular 5-400 nm and very particularly preferably 5-200 nm.

In a particularly preferred embodiment, the laser pigment according to the invention consists of a preparation of mica flakes which have been coated with a reducible metal oxide, preferably a titanium dioxide, and a reducing agent. The thickness of the titanium dioxide layer here is preferably 10-200 nm, in particular 20-100 nm and very particularly preferably 40-60 nm.

In a further preferred embodiment, the laser pigment according to the invention comprises flake-form pigments which are based on glass flakes and have been covered with a reducible metal oxide. Particular preference is given to glass flakes which have been covered with titanium dioxide.

If a reducible metal oxide, as described above, has been applied to a support, the proportion of metal oxide is 5-80% by weight, in particular 20-70% by weight and very particularly preferably 40-60% by weight, based on the support material.

Suitable reducing agents are, in particular, those which can easily be deposited in part or full on the surface of the metal compound to be reduced, in particular the metal oxide or metal-oxide mixture.

Particularly suitable reducing agents are, in particular, amino resins, preferably selected from the group melamine resin, urea resin, urea/melamine resin mixtures, but also polyamides, carbon, polyoxymethylene, polyacrylates, epoxy resins, polyurethanes, polyesters, casein derivatives, etc.

The ratio of the metal compound, in particular metal oxide or metal-oxide mixture, to reducing agent is generally 1-10:1, in particular 2-8:1 and very particularly preferably 3-6:1.

In a preferred embodiment, the metal compound to be reduced, preferably the metal oxide or metal-oxide mixture, which is in the form of support-free particles or in the form of a coating on a support material, is partially or fully coated on its surface with the reducing agent.

This embodiment is described below by way of example for titanium dioxide particles or for support materials coated with titanium dioxide, both of which are particularly preferably employed as metal compound to be reduced.

If titanium dioxide particles or support materials coated with titanium dioxide are sheathed, for example, with an amino resin, preferably a melamine resin, urea resin, urea-formaldehyde resin, urea/melamine resin mixture or a polyamide, similar reaction conditions as in the case of reduction of titanium dioxide using hydrogen in a calcination oven surprisingly arise when the organic or inorganic polymer system that comprises the pigments formed in this way is irradiated with laser light. As a consequence, the titanium dioxide is converted into a stable blue-black-coloured suboxide. The crystal modification in which the titanium dioxide exists (anatase or rutile) is unimportant here. Stabilised $TiO_2$ variations, such as, for example, $TiO_2$ stabilised (doped) with Al, Si, Zr, Mn, Sb, etc., and titanium dioxide coated on one of the supports already mentioned above also react analogously.

This reduction process of titanium dioxide can take place under conditions under which the surrounding polymer matrix is not yet damaged, for example carbonised. Marks in thin layers, such as, for example, in surface coatings and prints, and in papermaking stocks and paper coatings are therefore also possible with a laser pigment prepared in accordance with the invention. The polymer matrix to be marked, for example a plastic, as such in principle does not require a carbonisable content for the laser marking. Non-organic systems, for example inorganic systems, such as water-glass or coatings based on water-glass, comprising the pigment according to the invention can therefore also be marked.

The sheathing of the titanium dioxide particles with a reducing agent can be carried out, for example, by polycondensation, acid-catalysed by wet-chemical methods, of an aqueous solution of an amino resin in the presence of dispersed titanium dioxide particles or dispersed pigments which comprise titanium dioxide on a support material. The condensate of the amino resin is insoluble in water here and precipitates as a thin layer on the surface of the pure titanium dioxide or on the surface of the support material coated with titanium dioxide.

The coating of the other reducible metal compounds mentioned above with a reducing agent and the reaction under laser light of the laser pigments according to the invention prepared in this way also proceed analogously to the described coating of titanium dioxide particles or of support materials coated with titanium dioxide with a reducing agent.

For the reduction of the metal compound, in particular the metal oxide or metal-oxide mixture, using the laser, an amount of 5-80% by weight of reducing agent, based on the entire pigment, in particular 10-50% by weight and very particularly preferably 10-30% by weight, is necessary, where the reducing agent is preferably an amino resin.

In principle, no further additives are necessary for the function as laser-sensitive pigment.

If the reducing agent does not have adequate absorption of the laser, however, it is frequently advisable to add or incorporate an absorber into the laser pigment. The absorber can be added both to the reducing agent and also to the metal compound to be reduced, preferably the metal oxide or metal-oxide mixture (for example the titanium dioxide), or is uniformly distributed in the reducing agent and the metal compound to be reduced in the laser pigment according to the invention.

Suitable absorbers are, in particular, all absorbers known to the person skilled in the art for the laser marking of plastics, preferably carbon black, conductive pigments, such as, for example, antimony, Sb/Sn mixed oxides, for example $Sb_2O_3$, $(Sn, Sb)O_2$, $(Sn, Sb)O_2$-coated mica flakes, iron compounds, for example magnetite, molybdenum sulfide, molybdenum oxide, BiOCl, flake-form, in particular transparent or semi-transparent, substrates, for example phyllosilicates, finely divided metal particles, for example comprising tin, iron or aluminium, dyes, for example Nirsorb from Milliken, copper hydroxide phosphates or copper phosphates, for example $Cu_3(PO_4)_2*2Cu(OH)_2$ (CHP=libethenite), basic copper diphosphate $Cu_3(PO_4)_2*Cu(OH)_2$, copper pyrophosphate $Cu_2P_2O_7*H_2O$, $4CuO*P_2O_5*H_2O$, $5CuO*P_2O_5*3H_2O$, $6CuO*P_2O_5*3H_2O$, $4CuO*P_2O_5*3H_2O$, $4CuO*P_2O_5*1.2H_2O$, $4CuO*P_2O_5$, $4CuO*P_2O_5*1.5H_2O$. It is also possible to employ mixtures of the said copper hydroxide phosphates or copper phosphates. Of the copper phosphates, libethenite is particularly preferred.

Particularly preferred absorbers are selected from the group carbon black, antimony, Sb/Sn mixed oxides, (Sn,Sb)$O_2$-coated mica flakes, magnetite, molybdenum sulfide, molybdenum oxide, BiOCl, phyllosilicates and dyes.

Some of these are identical to the preferred metal compounds to be reduced that are described above. In such a case, the metal compound to be reduced simultaneously also acts as absorber. It is also possible to employ mixtures of a metal compound which absorbs laser light and another of the above-mentioned absorbers. Preferably, however, one or more of the absorbers described above are added to metal compounds to be reduced which are different therefrom, in particular doped or undoped $TiO_2$, but also $B_2O_3$, $SnO_2$, $Bi_2O_3$, silver halides, zinc sulfide, zinc oxalate or bismuth vanadate, in each case in particulate form or in the form of a coating on a support, or the reducing agents sheathing these metal compounds.

The incorporation of suitable light absorbers into the laser pigment then supports the reaction to the laser bombardment and results in a greater colour change. To this end, only very small added amounts of absorber are sufficient, which also do not influence the colour of the polymer or only do so to an insignificant extent.

The concentration of the absorber or an absorber mixture is dependent on the reducing agent employed. The proportion of additionally employed absorber in the laser pigment according to the invention, if present, is generally 0.0001-5% by weight, preferably 0.001-2% by weight and in particular 0.01-1% by weight, based on the metal compound to be reduced, in particular the metal oxide or metal-oxide mixture.

In particular in the case where the laser pigment according to the invention comprises a metal compound to be reduced which is sheathed by a reducing agent and is in the form of nanoparticles having a particle size of up to 1000 nm, in particular in the form of support-free particles described above having a particle size of 10 to <100 nm, it is also advantageous for the preparation forming the pigment according to the invention additionally to comprise one or more protective colloids as further component.

The latter prevent these particularly finely divided particles comprising the metal compound to be reduced from clumping together when they are sheathed with the reducing agent. Since it is not a single nanoparticle, but instead a plurality of nanoparticles together that are in each case sheathed with the reducing agent here and in this way a cluster is produced which represents the laser pigment according to the invention, the job of the protective colloids is to ensure uniform distribution of the nanoparticles comprising the metal compound to be reduced in the cluster. The clusters here have a particle size of 0.01 to 20 µm, preferably 0.05 to 10 µm, particularly preferably 0.05 to <10 µm. In this way, a laser pigment according to the invention is obtained which has a particularly low hiding power since the nanoparticulate metal compounds distributed in the pigment hardly scatter incident visible light at all. At the same time, however, a laser pigment of this type is readily dispersible in the application medium. A laser pigment of this type can therefore also be used for marking virtually transparent application systems or particularly thin coatings.

Suitable protective colloids are the classes of compound known to the person skilled in the art for such purposes, in particular water-soluble polymers, such as partially hydrolysed polyvinyl acetate, polyvinyl alcohol, polyvinyl pyrrolidone, cellulose ethers (Tylose), such as, for example, methylcellulose, hydroxyethylcellulose and hydroxypropylmethylcellulose, polyacrylates, starch, proteins, alginates, pectins or gelatine. Particular preference is given to cellulose ethers, in particular hydroxyethylcellulose.

The protective colloids are added in small amounts of 0.01 to 5%, preferably 0.1 to 2%, based on the weight of the preparation. The size of the clusters can be set in a targeted manner here via the amount of protective colloids employed and any surfactants additionally present. The principle that a larger amount of protective colloids results in a reduced size of the clusters basically applies here.

If the laser pigment according to the invention consists of nanoparticulate metal compounds to be reduced with a coating of a reducing agent in the form, described above, of clusters, it is added to the application medium, i.e. the material to be laser-marked, in an amount of about 0.1 to 20% by weight, preferably 0.1 to 5% by weight and particularly preferably 0.5 to 2% by weight, based on the weight of the material to be laser-marked.

In a further preferred embodiment, the reducing agent is coated fully (sheathed) or partially with a reducible metal compound, in particular a metal oxide or metal-oxide mixture, such as, for example, titanium dioxide.

If, for example, finely divided, oxidisable material, which may be of either organic, inorganic, metallic or organometallic origin, such as, for example, carbon black, sulfites, cellulose powder, plastic powder, plant seeds, etc., is sheathed with a reducible metal compound, for example a metal oxide, the product of this sheathing reacts under laser bombardment in the same way as sheathed metal oxide to give suboxides or metals. In the case of titanium dioxide as partner, the reaction product of laser bombardment is a blue-black suboxide, which allows very high-contrast laser marking.

In a preferred embodiment, carbon black dispersed in water—analogously to the processes known for pearlescent pigments—is coated with $TiO_2$. The calcination of the resultant pigment for conversion of the hydroxide into the oxide is advantageously carried out with exclusion of oxygen in order that the included carbon black does not burn. This can be achieved relatively simply by flooding the oven with nitrogen. In this example, the carbon black acts both as absorber and also as reducing agent. If the reducing agent does not exhibit absorption of the laser, such as, for example, micro-fine plastic particles, ground organic material, for example flour, colourless inorganic reducing agents, the addition or incorporation of an absorber, as indicated above, is advisable.

If a reducing agent in finely divided particulate form, as described above, is coated with a metal compound to be reduced, the reducing agent advantageously has a particle size of 0.01 to 50 µm, in particular 0.1 to 20 µm.

The laser pigments according to the invention have particle sizes of 0.01-200 µm, preferably 0.01-100 µm, in particular 0.1-20 µm, in order that they can be employed universally for the laser marking of organic polymers and inorganic systems. The relatively small particle sizes here can advantageously be employed in thin layers and coatings, whereas relatively large particles can also be employed in plastic compositions.

In order to establish the particle size necessary in each case, the laser pigments according to the invention can, if necessary, be subjected to grinding.

For the purposes of the present invention, the particle size is regarded as being the length of the longest axis of the pigments. The particle size can in principle be determined using any method for particle-size determination that is familiar to the person skilled in the art. The particle-size determination can be carried out in a simple manner, depending on the size of the laser pigments, for example by direct observation and measurement of a number of individual particles in high-resolution light microscopes, but better in electron microscopes, such as the scanning electron microscope (SEM) or the high-resolution electron microscope (HRTEM), but also in the atomic force microscope (AFM), the latter in each case with appropriate image analysis software. The determination of the particle size can advantageously also be carried out using measuring instruments (for example Malvern Mastersizer 2000, APA200, Malvern Instruments Ltd., UK), which operate on the principle of laser diffraction. Using these measuring instruments, both the particle size and also the particle-size distribution in the volume can be determined from a pigment suspension in a standard method (SOP). The last-mentioned measurement method is preferred in accordance with the present invention.

The determination of the particle size of the metal compound to be reduced or of the reducing agent can also be carried out analogously to the determination of the particle size of the laser pigments according to the invention if the metal compound and reducing agent are, as described above, in particulate form.

The laser pigments according to the invention can have various shapes. Depending on whether a particulate metal compound to be reduced or a metal compound to be reduced on a support is coated with a reducing agent or whether a particulate reducing agent is coated with a metal compound to be reduced, and depending on the original shape of the respective compound to be coated, the laser pigments according to the invention are generally in spherical shape, egg shape, lenticular shape, sausage shape, etc. It goes without saying with respect to the preparation process that these shapes do not have to be regular, but may also be deformed.

Particularly preferred intrinsically markable laser pigments in accordance with the present invention are mentioned below:

| Metal compound | Reducing agent | Absorber |
| --- | --- | --- |
| Titanium dioxide (pigment without support) | Melamine resin | Carbon black, magnetite, $(Sn, Sb)O_2$ |
| Titanium dioxide on support (mica flake coated with $TiO_2$) | Melamine resin | Carbon black, magnetite, $(Sn, Sb)O_2$ |
| Titanium dioxide on support (glass flake coated with $TiO_2$) | Melamine resin | Carbon black, magnetite, $(Sn, Sb)O_2$ |
| Titanium dioxide (pigment without support) | Urea-formaldehyde resin | Carbon black, magnetite, $(Sn, Sb)O_2$ |
| Titanium dioxide on support (mica flake coated with $TiO_2$) | Urea-formaldehyde resin | Carbon black, magnetite, $(Sn, Sb)O_2$ |
| Titanium dioxide on support (glass flake coated with $TiO_2$) | Urea-formaldehyde resin | Carbon black, magnetite, $(Sn, Sb)O_2$ |
| Titanium dioxide (pigment without support) | Melamine-formaldehyde resin | Carbon black, magnetite, $(Sn, Sb)O_2$ |
| Titanium dioxide on support (mica flake coated with $TiO_2$) | Melamine-formaldehyde resin | Carbon black, magnetite, $(Sn, Sb)O_2$ |
| Titanium dioxide on support (glass flake coated with $TiO_2$) | Melamine-formaldehyde resin | Carbon black, magnetite, $(Sn, Sb)O_2$ |
| Titanium dioxide (as coating) | Carbon black particles | Carbon black, magnetite, $(Sn, Sb)O_2$ |
| Copper hydroxide phosphate particles | Melamine-formaldehyde resin | Carbon black, magnetite, $(Sn, Sb)O_2$ |
| Titanium dioxide (as coating) | Polyamide particles | Carbon black, magnetite, $(Sn, Sb)O_2$ |
| Sb/Sn mixed oxide pigment | Melamine-formaldehyde resin | |
| Sb/Sn mixed oxide on support mica flake | Melamine-formaldehyde resin | |

The present invention also relates to a process for the preparation of the intrinsically laser-markable pigment according to the invention described above, in which one or more reducible metal compounds are partially or fully coated with a reducing agent, or a reducing agent is partially or fully coated with one or more reducible metal compounds.

The reducible metal compound here can be in the form of support-free particles or in the form of a coating on a support. If a reducing agent is coated with a metal compound to be reduced, the reducing agent is also in finely divided particulate form.

The details of the process have already been described above with respect to the structure of the pigment according to the invention, in particular with reference to the example of titanium dioxide as metal compound to be reduced. To this extent, reference is made to the comments made there.

The present invention also relates to the use of the pigment according to the invention described above for the laser marking of inorganic systems and of organic polymers. Details in this respect have likewise already been explained above.

In particular, the present invention also relates to an organic polymer system or an inorganic system which comprises the intrinsically laser-markable pigment according to the invention.

Through the addition of the laser pigments according to the invention as additives, in particular in concentrations of 0.1 to 30% by weight, preferably 0.5 to 20% by weight and very particularly preferably 1 to 10% by weight, based on the, preferably organic, polymer or polymer system to be marked, significantly higher contrast is achieved in the laser marking of polymers than with the commercially available absorbers at comparable concentrations. The said concentrations are not solely dependent on the desired contrast, but also on the layer thickness of the use medium. Thus, significantly higher concentrations are necessary in print and coating applications than in plastics in order to provide the laser beam with a sufficient number of pigment particles.

The concentration of the laser pigment according to the invention in polymers or in polymer systems, preferably in thermoplastics, thermosets or elastomers, is, however, also dependent on the polymer material employed. The low proportion of laser pigment changes the polymer system insignificantly and does not affect its processability.

Furthermore, colorants can be added to the polymers, allowing colour variations of all types and at the same time ensuring retention of the laser marking. Suitable colorants are, in particular, coloured metal-oxide pigments and organic pigments and dyes which do not decompose during the laser marking and do not react under laser light.

Suitable polymeric materials for the laser marking are, in particular, all known plastics, in particular thermoplastics, furthermore thermosets and elastomers, as described, for example, in Ullmann, Vol. 15, pp. 457 ff., Verlag VCH. Suitable polymers are, for example, polyethylene, polypropylene, polyamides, polyesters, polyester-esters, polyether-esters, polyphenylene ether, polyacetal, polyurethane, polybutylene terephthalate (PBT), polymethyl methacrylate, polyvinyl acetal, polystyrene, acrylonitrile-buta-diene-styrene (ABS), acrylonitrile-styrene-acrylate (ASA), polycarbonate, polyether sulfones and polyether ketones, and copolymers, mixtures and/or polymer blends thereof, such as, for example, PC/ABS, MABS.

The laser pigment according to the invention is incorporated into the polymer to be marked, preferably a plastic or plastic film, or a coating, for example a paint, a paper coating or a powder coating, an automobile paint or a printing ink, by mixing the polymer granules, the surface coating or the printing ink with the laser pigment and optionally deforming the mixture under the action of heat. The laser pigment can be added to the polymer simultaneously or successively. Adhesives, organic polymer-compatible solvents, stabilisers and/or surfactants which are temperature-stable under the working conditions can optionally be added to the polymer, preferably plastic granules, during incorporation of the laser pigment.

Plastic granules doped with the laser pigment are generally prepared by initially introducing the plastic granules in a suitable mixer, wetting them with any additives and then adding and incorporating the laser pigment. The polymer is generally pigmented via a colour concentrate (masterbatch) or compound. The resultant mixture can then be processed directly in an extruder or injection-moulding machine. The mouldings formed on processing exhibit a very homogeneous distribution of the laser pigment. The laser marking is subsequently carried out using a suitable laser.

The invention also relates to a process for the preparation of a polymer doped with the pigment according to the invention, in which a polymeric material is mixed with the laser pigment according to the invention, and the pigment is incorporated into the polymer or polymer matrix by means of an extruder. The polymer composition obtained in this way is then optionally deformed under the action of heat.

The laser inscription is carried out by introducing the sample into the ray path of a pulsed laser, preferably an Nd:YAG laser. Furthermore, inscription using an excimer laser, for example via a mask technique, is possible. However, the desired results can also be achieved using other conventional types of laser which have a wavelength in a region of high absorption by the pigment used. The mark obtained is determined by the irradiation time (or number of pulses in the case of pulsed lasers) and irradiation power of the laser and the plastic system used. The power of the lasers used depends on the respective application and can readily be determined by the person skilled in the art in each individual case.

The laser used generally has a wavelength in the range from 157 nm to 10.6 µm, preferably in the range from 532 nm to 10.6 µm. For example, $CO_2$ lasers (10.6 µm) and Nd:YAG lasers (1064 or 532 nm) or pulsed UV lasers may be mentioned here. The excimer lasers have the following wavelengths: $F_2$ excimer laser (157 nm), ArF excimer laser (193 nm), KrCl excimer laser (222 nm), KrF excimer laser (248 nm), XeCl excimer laser (308 nm), XeF excimer laser (351 nm), frequency-multiplied Nd:YAG lasers having wavelengths of 355 nm (frequency-tripled) or 265 nm (frequency-quadrupled). Particular preference is given to the use of Nd:YAG lasers (1064 or 532 nm) and $CO_2$ lasers. The energy densities of the lasers employed are generally in the range from 0.3 mJ/cm$^2$ to 50 J/cm$^2$, preferably 0.3 mJ/cm$^2$ to 10 J/cm$^2$. On use of pulsed lasers, the pulse frequency is generally in the range from 1 to 60 kHz. Corresponding lasers which can be employed in the process according to the invention are commercially available.

The polymer doped with the laser pigment according to the invention can be used in all areas where conventional printing processes were hitherto employed for the inscription of plastics and plastic films. For example, moulding compositions, semifinished products and finished parts made from the polymer according to the invention can be used in the electrical, electronics and motor vehicle industries. The labelling and inscription of, for example, cables, lines, decorative strips or functional parts in the heating, ventilation and cooling sectors or switches, plugs, levers and handles which consist of the polymer doped in accordance with the invention can be marked with the aid of laser light, even in poorly accessible areas. Furthermore, the polymer system according to the invention can be employed for packaging in the foods sector or in the toys sector. Marks on packaging are distinguished by the fact that they are wipe- and scratch-resistant, stable during subsequent sterilisation processes and can be applied hygienically during the marking process. Furthermore, plastic corks, for example for wine bottles, can be inscribed.

Complete label images can be applied in a durable manner to the packaging for a re-usable system. Furthermore, the polymer system according to the invention is used in medical technology, for example in the marking of Petri dishes, microtitre plates, disposable syringes, ampoules, sample containers, supply tubes and medical collection bags or storage bags.

A further important area of application for laser inscription is plastic marks for the individual labelling of animals, so-called cattle tags or ear marks. The information which belongs specifically to the animal is stored via a bar code system. This information can be called up again when needed with the aid of a scanner. The inscription must be very durable since the marks in some cases remain on the animals for a number of years.

The laser marking of moulding compositions, semifinished products and finished parts which consist of polymers doped with the laser pigment according to the invention is thus possible.

The following examples are intended to explain the invention, but without limiting it. The percent data indicated are percent by weight.

EXAMPLES

Metal Oxide Sheathed with Reducing Agent

Example 1

100 g of rutile titanium dioxide pigment having a particle size in the range 100-500 nm (RN 2900 from Kronos) are slurried in 150 g of water. 25 g of melamine resin (Madurit powder from Ineos) and 0.1 g of an aqueous carbon black dispersion having a carbon black content of 25% (Derussol N25/L from Evonik) are stirred into this titanium dioxide suspension, and the entire batch is dispersed in a bead mill (bead mill attachment for "Dispermat" dissolver from Getzmann). The fully dispersed batch is subsequently warmed to 70° C. and adjusted to pH=4 using approximately 30 ml of a 25% solution of p-toluenesulfonic acid. After a reaction time of 30 min, the batch is allowed to cool and is then filtered through a suction filter. Drying is carried out overnight at 180° C.

The material obtained in this way has a particle size, determined using a Mastersizer 2000 from Malvern Instruments Ltd. under standard conditions, of $D_{95}=20$ µm and is incorporated to the extent of 1% into polypropylene by means of an extruder. This compound is then moulded in an injection-moulding machine to give test plates measuring 9 cm×6 cm×0.15 cm. Test grids are marked on these plates using an Nd:YAG laser, by means of which a wide range of different laser settings with respect to laser energy, laser beam speed and laser pulse frequency can be displayed.

The following laser settings are tested:
Diode-pumped 12 W Nd:YAG laser from Trumpf.
The test grid consists of filled squares having edge lengths of 4 and 2 mm. The energy is varied from 30% to 100% of the maximum power in steps of 10% each. The writing speed is varied between 200 mm/s and 2000 mm/s and the frequency between 1 KHz and 60 KHz.

The additive from Example 1 exhibits a uniform black mark with excellent contrast over the entire range of different laser parameters.

Example 2

80 g of an aqueous urea-formaldehyde resin solution (Kaurit 210 liquid from BASF) having a content of 50% of resin are diluted with 100 g of water. 0.02 g of flame black FW 1 from Evonik are stirred into this solution. 100 g of an anatase titanium dioxide pigment having a particle size of 100-500 nm (Kronos 1171) are stirred in a dissolver and then dispersed at increased speed (of 2500 rpm=about 8 m/s peripheral velocity for a dissolver disc diameter of 60 mm). The fully dispersed batch is subsequently warmed to 70° C. and adjusted to pH=4 using about 4 ml of a 25% citric acid solution. After a reaction time of 30 min, the batch is allowed to cool and is then filtered through a suction filter. Drying is carried out overnight at 180° C.

The material obtained in this way has a particle size, determined analogously to Example 1, of $D_{95}=30$ µm is stirred into a 10% aqueous solution of polyvinyl alcohol. A film which, after drying, has a layer thickness of 50 µm is drawn therefrom using a hand coater. This film is marked with the test grid using an Nd:YAG laser analogously to Example 1. The result likewise shows a high-contrast, black mark with virtually constant blackening over a broad range of the various laser parameters.

Example 3

20 g of silver nitrate ($AgNO_3$) are dissolved in 100 g of water. 50 g of kaolin having a particle size $D_{95}=30$ µm are stirred into this solution, and the silver is filled onto the kaolin as silver chloride (AgCl) by dropwise addition of 80 g of 10% NaCl solution with stirring. Before the addition of 30 g of Madurit MW 116 (75% melamine-formaldehyde resin solution from Ineos), the suspension is adjusted to pH 8 using NaOH. The entire batch is then warmed to 70° C. and, when this temperature has been reached, acidified to pH 3-4 by slow dropwise addition of 1 molar HCl. After a reaction time of about 30 min, the entire mixture is allowed to cool and is filtered through a suction filter. Drying is carried out overnight at 180° C.

The material obtained in this way has a particle size, determined analogously to Example 1, of $D_{95}=100$ µm and is incorporated into polypropylene to the extent of 0.5% by means of an extruder. This compound is then moulded in an injection-moulding machine to give test plates measuring 9.0 cm×6.0 cm×0.15 cm. The test grid is marked on these plates using a $CO_2$ laser at a wavelength of 10.6 µm and with the variations with respect to laser power and laser speed analogously to Example 1. The laser bombardment reduces the silver chloride to finely divided elemental silver, and the mark exhibits high-contrast black over virtually the entire band width of the laser parameters.

Reducing Agent Sheathed with Metal Oxide

Example 4

0.2 g of an aqueous carbon black dispersion having a primary particle size of 25 nm (Derussol A from Evonik) are diluted in 1.5 liters of water and adjusted to pH 2.2 using HCl. This suspension is warmed to 75° C. with stirring. 400 g of $TiCl_4$ solution are subsequently added dropwise, during which the pH is kept constant at 2.2 using NaOH. After cooling, the batch is filtered with suction, and the filter cake is dried to constant weight at 180° C. After drying, the material is calcined at 600° C. under nitrogen.

The pigment obtained in this way has a particle size, determined analogously to Example 1, of $D_{95}=10$ μm and is incorporated into polypropylene by means of an extruder. This compound is then moulded in an injection-moulding machine to give test plates measuring 9 cm×6 cm×0.15 cm. Test grids, by means of which a large band width of various laser settings with respect to laser energy, laser beam velocity and laser pulse frequency can be displayed, are marked on these plates analogously to Example 1 using an Nd:YAG laser.

A high-contrast dark mark is obtained at virtually all laser settings present in the test grid.

Example 5

100 g of finely divided Vestosint 2159 polyamide powder from Evonik having a particle size of $D_{50}=11$ μm are physically mixed homogeneously with 100 g of a rutile titanium dioxide pigment having a $TiO_2$ content of 92.5% and a particle size distribution of 100 to 500 nm which has been stabilised for outdoor applications using Al and Si (Kronos 2230 from Kronos Titan) and a proportion of 0.05% of carbon black powder (FW 200 from Evonik) and then bonded strongly and intimately to one another by means of a suitable mechanical process, such as, for example, the Nara mechanofusion process, through the action of large mechanical forces. The relatively large plastic particles are retained here as primary particles, whereas the significantly smaller pigment particles are incorporated into the surface of the plastic with the aid of the mechanical energy of the process. The laser pigment obtained has a particle size, determined analogously to Example 1, of $D_{95}=30$ μm.

The laser marking of the material prepared in this way shows, after it is incorporated into a plastic in a concentration of 1%, a dark and high-contrast mark, which is caused both by carbonisation of the plastic and at the same time also by reduction of the titanium dioxide to a black suboxide.

Example 6

50 g of an aqueous urea-formaldehyde resin solution (Kaurit 210 liquid from BASF) having a content of 50% of resin are mixed with 5 g of carbon black (1% aqueous carbon black dispersion, prepared from Derusol N25/L from Evonik), 50 g of a nanoparticulate titanium dioxide pigment (P25 from Evonik, average primary particle size 21 nm) and 50 g of a 0.4% solution of tylose H20 and dispersed in a dissolver. The fully dispersed batch is subsequently warmed to 70° C., mixed with a further 100 g of a 0.4% tylose solution and adjusted to pH 3 to 4 using about 4 ml of a 10% oxalic acid solution. After a reaction time of about 30 min, the batch is allowed to cool and is then filtered through a suction filter. The filter cake is preferably washed with deionised water. Drying is carried out overnight at 180° C.

The pale-grey powder obtained in this way has a particle size, determined analogously to Example 1, of $D_{95}=1$ μm and is stirred into a 10% aqueous solution of polyvinyl alcohol so as to give a 1.5% dispersion. A film which, after drying, has a layer thickness of 50 μm is drawn therefrom using a hand coater. This film, which, besides the laser pigment according to the invention, comprises no further pigments or dyes, exhibits only slight haze. It is marked with the test grid using an Nd:YAG laser analogously to Example 1. The result likewise shows a high-contrast, black mark with virtually constant blackening over a broad range of the various laser parameters.

The invention claimed is:

1. In an intrinsically laser-markable pigment, the improvement wherein the pigment is in the form of a preparation comprising one or more reducible metal compounds that exhibit a color change through a chemical reduction and a reducing agent, and the pigment has a particle size of 0.01-200 μm.

2. The pigment according to claim 1, wherein the reducible metal compound is in direct and intimate contact with the reducing agent.

3. The pigment according to claim 1, wherein the reducible metal compound is in the form of a support-free particle.

4. The pigment according to claim 1, wherein the reducible metal compound is in the form of a coating on a support.

5. The pigment according to claim 1, wherein the reducible metal compound is partially or fully coated with a reducing agent.

6. The pigment according to claim 1, wherein the reducing agent is partially or fully coated with a reducible metal compound.

7. The pigment according to claim 1, wherein the reducible metal compound is a doped or undoped metal oxide.

8. The pigment according to claim 1, wherein the reducible metal compound is $TiO_2$ in rutile or anatase form, $B_2O_3$, $Fe_2O_3$, $SnO_2$, $BiOCl$, $Bi_2O_3$, or silver halides.

9. The pigment according to claim 7, wherein the metal oxide is doped or undoped titanium dioxide.

10. The pigment according to claim 1, wherein the reducing agent is an amino resin.

11. The pigment according to claim 1, wherein the reducing agent is melamine resin, urea resin, urea-formaldehyde resin, urea/melamine resin mixtures or polyamide.

12. The pigment according to claim 4, wherein the support is mica flakes, silicon dioxide flakes, glass flakes, ceramic flakes, aluminium oxide flakes, iron oxide flakes or graphite flakes.

13. The pigment according to claim 12, wherein the support is a mica flake or glass flake.

14. The pigment according to claim 1, wherein the pigment additionally comprises one or more absorbers.

15. The pigment according to claim 14, wherein the absorber is carbon black, antimony, Sb/Sn mixed oxides, $(Sn,Sb)O_2$-coated mica flakes, copper hydroxide phosphate, copper phosphate, magnetite, molybdenum sulfide, molybdenum oxide, BiOCl, thiosilicates, or dyes.

16. The pigment according to claim 1, wherein the pigment additionally comprises one or more protective colloids.

17. The pigment according to claim 3, wherein the support-free particle has a particle size in the range from 1 nm to 1000 nm.

18. The pigment according to claim 17, wherein the particle size is in the range from 10 nm to <100 nm.

19. A process for the preparation of a pigment according to claim 1, comprising partially or fully coating one or more reducible metal compounds with a reducing agent or partially or fully coating a reducing agent with one or more reducible metal compounds.

20. The process according to claim 19, wherein the reducible metal compound is in the form of a support-free particle or in the form of a coating on a support and is partially or fully coated with a reducing agent.

21. A process for the laser marking of inorganic systems and of organic polymers, comprising exposing to laser radiation said system or polymer containing a pigment according to claim 1.

22. An organic polymer comprising an intrinsically laser-markable pigment according to claim 1.

23. The polymer according to claim 22, having a proportion of the intrinsically laser-markable pigment in the polymer of 0.1-30% by weight, based on the polymer.

24. The polymer according to claim 22, that is a plastic, a plastic film, a surface coating, an automobile paint, a powder coating, a printing ink or a paper coating.

25. A process for the preparation of the polymer according claim 22, comprising incorporating the intrinsically laser-markable pigment into the polymer or polymer matrix using an extruder.

26. The pigment according to claim 1, wherein the reducing agent is present in an amount of 10-50% by weight based on the entire pigment.

\* \* \* \* \*